United States Patent [19]

Seki

[11] Patent Number: 5,230,098
[45] Date of Patent: Jul. 20, 1993

[54] RELAY RECEIVER HAVING A VARIABLE BANDWIDTH

[75] Inventor: Junji Seki, Nishinasunomachi, Japan

[73] Assignee: Fujitsu Limited, Kawasaki, Japan

[21] Appl. No.: 437,204

[22] Filed: Nov. 16, 1989

[30] Foreign Application Priority Data

Nov. 18, 1988 [JP] Japan .................. 63-292597

[51] Int. Cl.$^5$ ............................. H04B 1/10
[52] U.S. Cl. .................. 455/234.1; 455/10; 455/266
[58] Field of Search ........... 455/9, 10, 19, 20, 232, 455/234, 200, 266, 232.1, 234.1, 200.1

[56] References Cited

U.S. PATENT DOCUMENTS

| | | | |
|---|---|---|---|
| 3,035,169 | 5/1962 | Griffith | 455/10 |
| 3,872,387 | 3/1975 | Banach | 325/427 |
| 3,931,576 | 1/1976 | Csicsatka et al. | 455/266 |
| 4,677,687 | 6/1987 | Matsuo | 455/10 |
| 4,989,264 | 1/1991 | Ohto | 455/266 |

OTHER PUBLICATIONS

Reghinot, J. C., "Hyperfréquences et faisceaux hertziens", *Toute L'Electronique*, No. 500, Jan. 1985, pp. 50-55.
Patent Abstracts of Japan, vol. 6, No. 147 (E-123) Aug. 6, 1982 for JP-A-57-068-934 (Fujitsu) Apr. 27, 1982.
Patent Abstracts of Japan, vol. 8, No. 84 (E-239) [1521] Apr. 18, 1984 for JP-A-59 5714 (Matsushita) Jan. 12, 1984.
Patent Abstracts of Japan, vol. 10, No. 329 (E-452) [2385], Nov. 8, 1986 for JP-A-61-135-214 (NEC) Jun. 23, 1986.

*Primary Examiner*—Reinhard J. Eisenzopf
*Assistant Examiner*—Edward Urban
*Attorney, Agent, or Firm*—Staas & Halsey

[57] ABSTRACT

A relay receiver performs a heterodyne relay operation by using a receiving frequency converting portion, an intermediate frequency amplifying portion and an automatic gain controller. The variable band limiting portion limits an amplified signal output from the intermediate frequency amplifying portion to a band corresponding to the state of a band control signal, thereby transmitting an amplified signal. The band control portion is responsive to an automatic gain control signal outputted from the automatic gain controller, and outputs to the variable band limiting portion a band control signal for enabling the variable band limiting portion to limit the amplified signal to a narrow band in accordance with a decrease in the arriving level of the high frequency band received signal. Therefore, the frequency band of a communication signal amplified by the intermediate frequency amplifying portion is narrowed only when the arriving level of a received signal is low.

7 Claims, 7 Drawing Sheets

PRIOR ART

RELAY RECEIVER HAVING A VARIABLE BANDWIDTH

BACKGROUND OF THE INVENTION

1. Field of the Invention

The present invention relates to a relay receiver for performing a heterodyne relay to be used for a radio communication system.

2. Description of the Related Art

Radio communication systems using microwaves, for example, are widely used for transmission of telephone, television and other signals. The field of digital communication technology has recently been developing and the role of radio communication systems has become increasingly important. The Integrated Services Digital Network, or ISDN, is a good example.

Radio communication systems require a relay system to perform long-distance communication. These systems generally use a heterodyne relay, a detection relay or a direct relay.

The heterodyne relay system converts a received microwave into an intermediate frequency band wave and then reconverts the intermediate frequency band wave into a microwave for transmission.

The detection relay system demodulates the received microwave to provide a base band signal and then remodulates the base band signal into a microwave for transmission.

The direct relay system amplifies the received microwave, for example, in the frequency band of the received microwave.

The system most used is the heterodyne relay system because modulation distortion is not added every time the relay is conducted.

Figure 1:
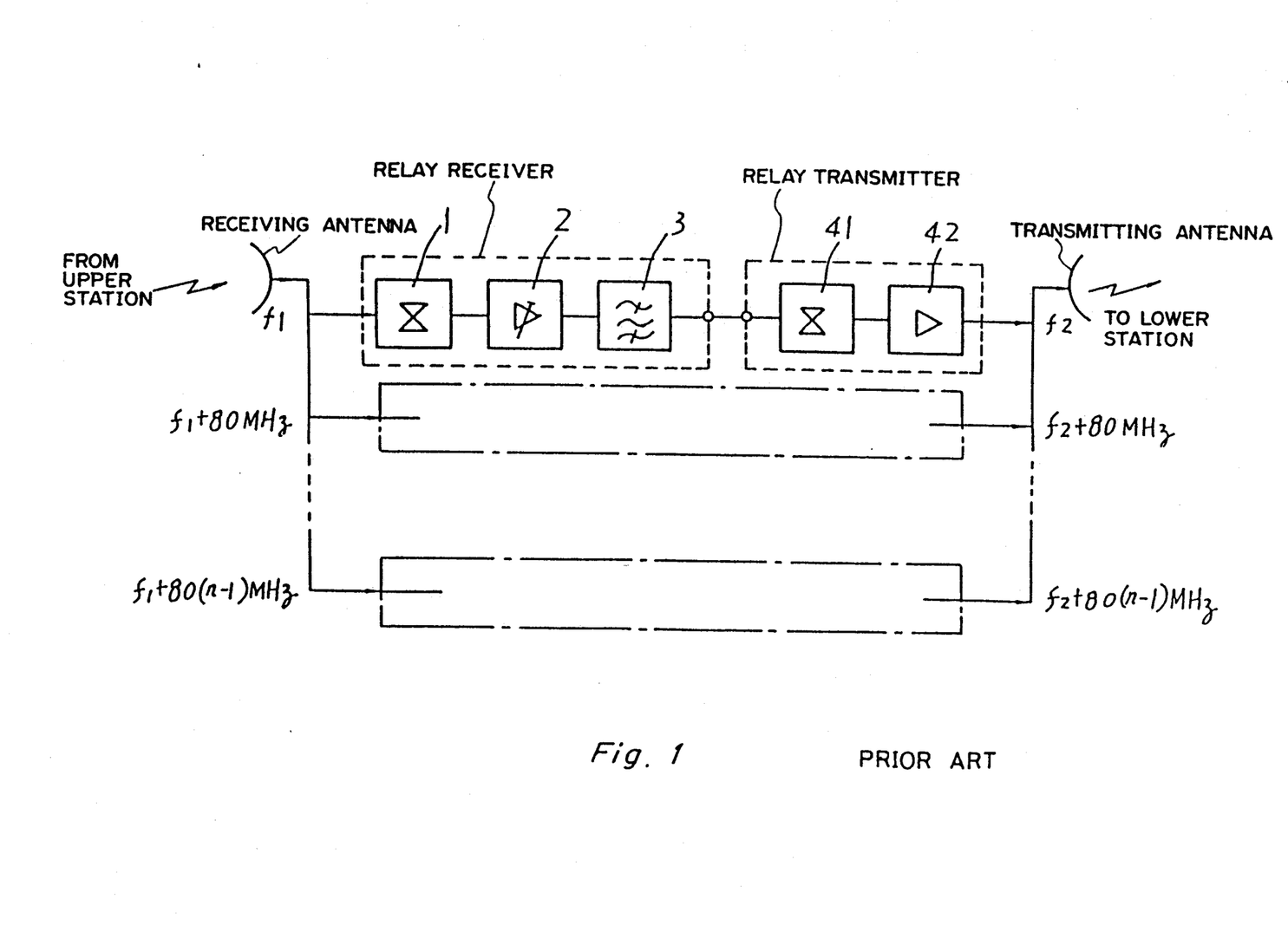
FIG. 1 is an explanatory view of an example of heterodyne relay system.

FIG. 1 shows the general structure of such a heterodyne relay system. A relay station receives n channel communication signals whose receiving frequencies differ from each other by 80 MHz, performs a heterodyne relay, and thereafter transmits n channel communication signals whose frequencies also respectively differ from each other by 80 MHz.

Note that the communication signal transmitted from the upper station includes n channels with central frequencies from $f_1$ MHz to $(f_1 + 80(n-1))$ MHz every 80 MHz.

The above communication signals corresponding to the respective channels are received by a common receiving antenna, are divided into several parts by a wave divider (not shown), and are input to the relay receiving apparatus. In FIG. 1, only the relay receiver corresponding to a received signal with a central frequency $f_1$ is shown, but the same structure may be applied to the other central frequencies. This relay receiver comprises a receiving frequency converting portion 1, intermediate frequency amplifier portion 2 and bandpass filter 3.

The receiving frequency converting portion 1 converts the frequency of the received signal with central frequency $f_1$ transmitted from the upper station into an intermediate signal. The converted output is amplified to reach a predetermined level by intermediate frequency amplifying portion 2, which includes an automatic gain control unit. The amplified output is limited to a predetermined band by bandpass filter 3 to be transmitted to a relay transmitter. The bandpass filter performs waveforming and noise removing functions. A relay transmitter comprises transmitting frequency converting unit 41 and transmitting high frequency amplifier 42.

The relay transmitter converts the output of the bandpass filter 3 into transmission frequency $f_2$ by means of a transmission frequency converting unit 41. This converted output is then amplified by a transmission high frequency amplifier 42 to reach a predetermined level. This amplified output is finally mixed with the transmission signal of the other frequency bands through a wave divider (not shown), and is transmitted to the lower stage through a transmission antenna.

The operation of the relay receiver and relay transmitter recited above is similarly applied to the communication signals corresponding to the other central frequencies $(f_1 + 80)$ MHz to $(f_1 + 80(n-1))$ MHz.

In these systems, fading, caused, for example, by rain, may occur in the transmission path, reducing the receiving level of the received signal below a predetermined level. When transmitting a digital signal, it is thus necessary to prevent an increase in the bit error ratio of received signal channels and to reduce interference between adjacent channels as much as possible.

Figure 2:
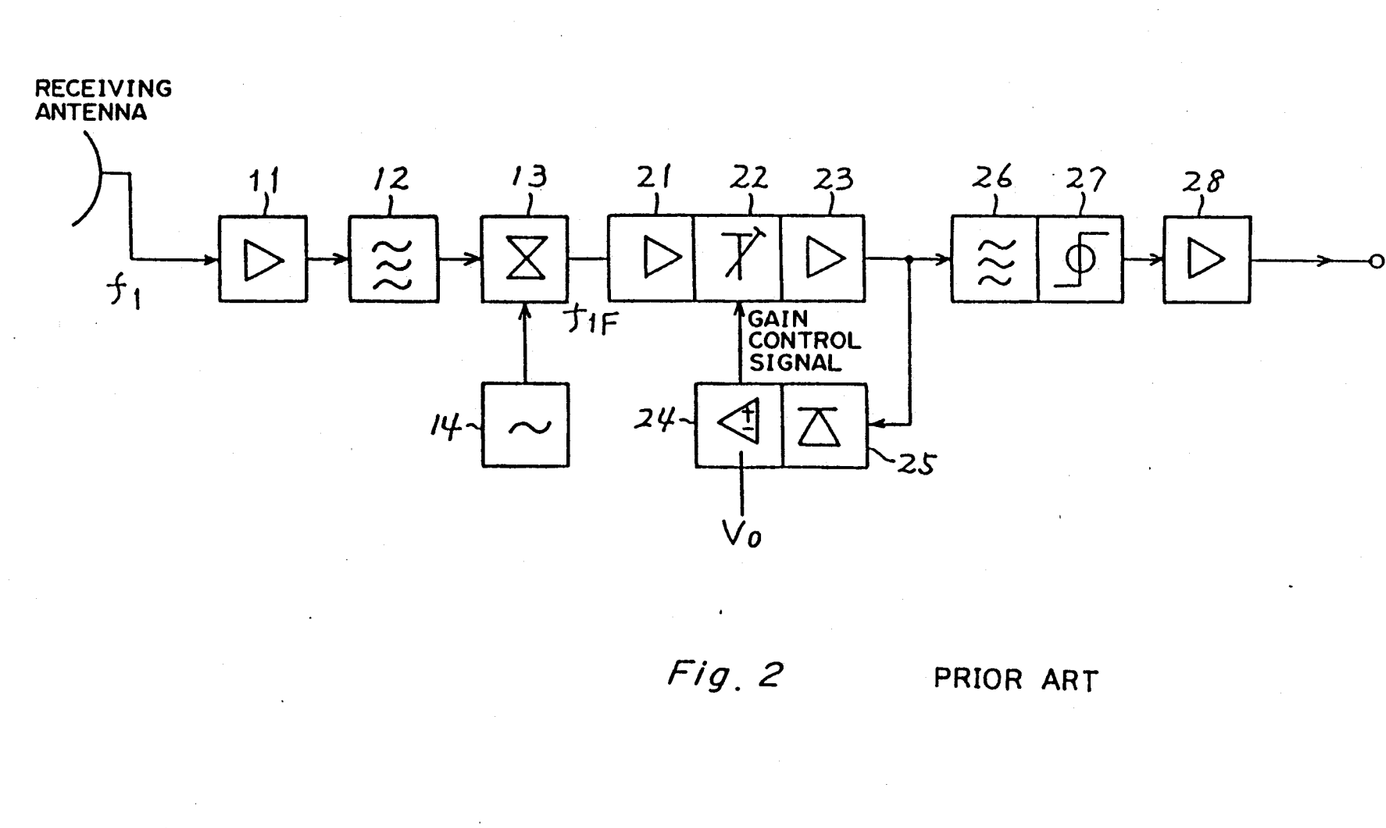
FIG. 2 is a block diagram of the conventional prior art.

FIG. 2 shows a conventional relay receiver of FIG. 1. The receiving frequency converting portion 1 in FIG. 1 comprises units 11 to 14 of FIG. 2, and the intermediate frequency amplifying portion 2 in FIG. 1 comprises units 21 to 28 of FIG. 2.

Here, the transmission signal is a digital modulation wave having a band width equal to clock frequency $f_{CK}$ (which is called $f_{CK}$ hereinafter).

In FIG. 2, a received signal with a central frequency $f_1$ and a standard arriving level of minus 20 dBm is received, for example, through the receiving antenna, amplified by a receiving high frequency amplifier 11, and then inputted to frequency converter 13 through band pass filter 12 with a band width of twice $f_{CK}$. This band pass filter 12 performs a waveforming and a noise removing function.

In addition a receiving station signal is inputted to the converter 13 by receiving station oscillator 14. Thus, the input receiving signal is then converted into an intermediate frequency $f_{IF}$, and this converted output is amplified by intermediate frequency amplifier 21.

The amplified output is passed through a variable attenuator 22 and is further amplified by intermediate frequency amplifier 23. A portion of the output from intermediate frequency amplifier 23 is detected by detector 25. The detected voltage outputted from detector 25 is applied to comparator 24, which compares the above detected voltage with a standard voltage $V_0$. The amount of attenuation performed by variable attenuator 22 is controlled based upon a gain control signal outputted from the comparator so that the difference between the detected voltage and the standard voltage $V_0$ becomes 0.

Therefore, the output level from intermediate frequency amplifier 23 is kept constant even if the receiving level of the received signal varies.

The output of intermediate frequency amplifier 23 is inputted to intermediate frequency band pass filter 26, which limits the band width of the input signal to the band width 1.5 times $f_{CK}$. Intermediate frequency band pass filter 26 performs the function of waveformation and a noise removal.

The output of this intermediate frequency band pass filter 26 is next transmitted to relay equalizer 27, which equalizes the relay distortion caused by high frequency band pass filter 12 and intermediate frequency band pass filter 26. The output of the relay equalizer 27 is then further amplified by intermediate frequency amplifier 28.

Figure 3A:
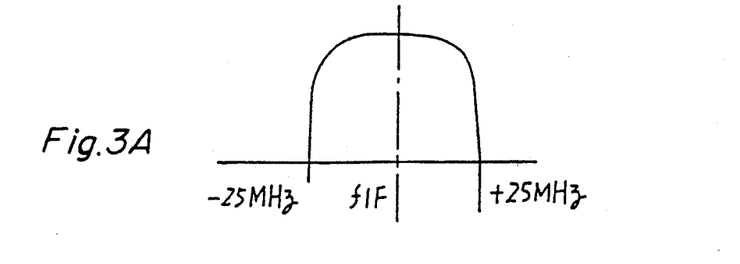
FIGS. 3A and 3B are views for explaining the problem of the prior art.

As is described above, the amplification operation is conducted by a relay receiver. In a system with this structure, if the receiving level of the received signal with a central frequency $f_1$ is at a standard receiving level, the frequency characteristic of the amplified signal outputted from the relay receiver becomes as shown in FIG. 3A. The frequency characteristics of a transmitted signal with a central frequency $f_2$ outputted from the relay receiver has the same characteristics obtained by replacing the central frequency $f_{IF}$ in FIG. 3A with $f_2$. Therefore, the transmitted signal has the band width of 50 MHz.

If the receiving level of the received signal decreases to a level of about 70 dBm, for example, because of rain or an occurrence of fading along its transmission path, the output of the intermediate frequency amplifier 23 in FIG. 2 is decreased in a corresponding manner. In this case, comparator 24 is controlled so that the amount of attenuation performed by variable attenuator 24 becomes almost 0 in accordance with a gain control signal.

As a result of the above operation, the total gain of intermediate frequency amplifier 21, variable attenuator 22, and intermediate frequency amplifier 23 increases and the output of intermediate frequency amplifier 23 is kept constant even if the receiving level changes.

Figure 3B:
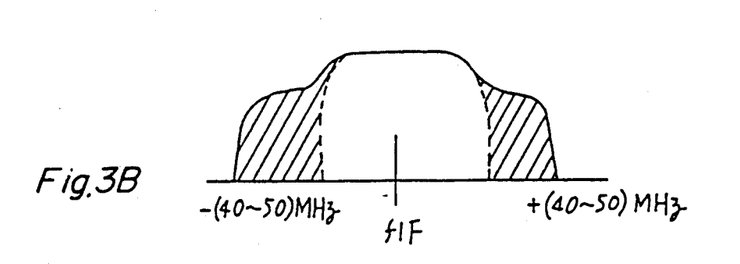

However, the increase in gain causes the noise component passing through intermediate frequency band pass filter 26 to increase. The noise component, which has been either inputted to receiving high frequency amplifier 11 or produced by receiving high frequency amplifier 11, is superimposed on the received signal to relatively high level, and thus the noise component superimposed on the received signal cannot be disregarded. The resulting frequency characteristic of the amplified signal outputted from the relay receiver is shown in FIG. 3B. Thus, the frequency characteristic of the transmitted signal outputted from the relay receiver is equal to the characteristic obtained by replacing the central frequency $f_{IF}$ in FIG. 3B with $f_2$.

As should be clear from the above explanation, the frequency characteristics of the transmission signal include the noise component designated by a slanted line in FIG. 3B, in addition to the real transmission signal component having a band width of plus or minus 25 MHz with respect to the central frequency. In this case the noise component ranges from plus or minus 40 MHz to plus or minus 50 MHz with respect to the central frequency, thereby substantially increasing the band width of the transmission signal.

In the case where the receiving level of the received signal is low, S/N (Signal vs. noise ratio) of the transmitted signal decreases. Thus, during transmission of a digital signal, for example, the bit error ratio in a channel increases when the transmission signal having the above frequency characteristic is transmitted from the relay receiver to the local station (not shown). This transmission signal is then demodulated in the local station.

The band width of the transmission signal is widened in the frequency range from plus or minus 40 MHz to plus or minus 50 MHz. Therefore the transmission signal component in a local channel overlaps with a transmission signal component of an adjacent channel having a central frequency 80 MHz from that of the local channel. The bit error ratio of the adjacent channel is thus increased as in the example shown in FIG. 1. As a result, a plurality of channels of the system go down and in the case of a single supplementary line, that part of the system which goes down cannot be saved.

As described above, the major problem with the conventional relay receiver shown in FIG. 2 is that in the case of a decrease in the receiving level of the receiving signal, the bit error ratio of the channels relating to the receiving signal increases upon transmission of a digital signal. The result is interference between adjacent channels.

In order to solve the above problem, for example, consideration has been given to make the band width of intermediate frequency band pass filter 26 in FIG. 2 narrow enough only to allow the transmitted signal to pass. In the case shown in FIG. 3B, it may be considered that the intermediate frequency band pass filter 26 is made to pass only the frequency component of $f_{IF}$ plus or minus 25 MHz. However, a filter with a narrow band pass filter such as stated above degrades the amplitude delay characteristic of a passing signal every time the passing signal is made to pass through the filter. Therefore, if the characteristic of the above filter is made to have a uniformly narrow band width, the amplitude delay characteristic of the passing signal is degraded with an increase in the number of the relaying operations, and the bit error ratio of the channel relating to the passing signal is increased in accordance with the degradation in the amplitude delay characteristic of the passing signal.

SUMMARY OF THE INVENTION

The important objects of the present invention are to suppress the bit error ratio of a channel relating to a received signal and to suppress interference between adjacent channels, even if the receiving level of a received signal decreases.

The present invention first comprises a receiving frequency converting portion for converting a high frquency band received signal to an intermediate frequency band signal.

The invention further comprises an intermediate frequency amplifying portion for amplifying this intermediate frequency band signal outputted from the receiving frequency converting portion in accordance with the state of later described gain control signal.

The invention further comprises an automatic gain controller for outputting a gain control signal to the intermediate frequency amplifying portion so that the intermediate frequency amplifying portion can output an amplified signal at a predetermined level, based on the amplified signal outputted from the intermediate frequency amplifying portion, even if the arriving level of the received signals in the high frequency band changes.

The invention further comprises a variable band limiting portion for transmitting the amplified signal outputted from the intermediate frequency amplifying portion by limiting the amplified signal to a band corresponding to the state of a band control signal.

The invention further comprises a band control portion for outputting to the variable band limiting portion a band control signal which limits the amplified signal to a narrow band in accordance with a decrease in the arriving signal level of the high frequency band received signal and based upon the gain control signal outputted from the automatic gain control portion. The band control portion outputs to the variable band control portion a band control signal limiting the amplifying signal to a first band when the arriving level of the received signal in the high frequency band is more than a predetermined value. Conversely, the band control portion outputs to the variable band control portion a band control signal for limiting the amplifying signal to a second band narrower than the first band when the arriving level of the received signal in the high frequency band is less than the predetermined value.

As constructed above, the frequency band of the amplifying signal is narrowed only when the receiving level of the received signal is lowered. Therefore, the noise component is controlled and the conventional increase in the bit error ratio of the channel relating to the received signal is suppressed. The frequency band width of the transmitted signal has thus been prevented from expanding by the noise component and the interference between adjacent channels is thereby decreased.

BRIEF DESCRIPTION OF THE DRAWINGS

Other objects and characteristics of the present invention will be easily understood by persons skilled in the art based on the description of the preferred embodiment together with the attached drawings.

DESCRIPTION OF THE PREFERRED EMBODIMENT

Figure 4:
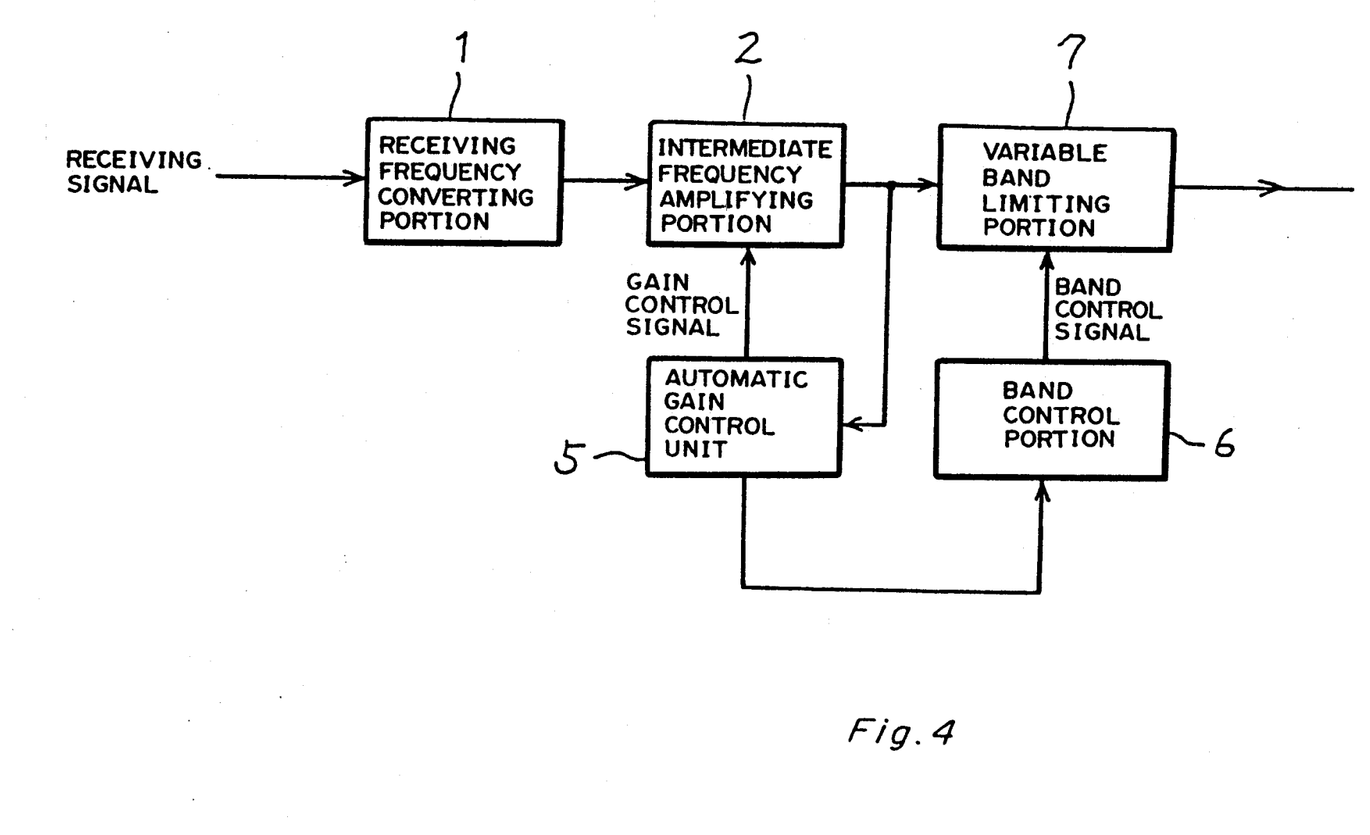
FIG. 4 shows a principle block diagram of the present invention.

FIG. 4 shows a block diagram of the principle operating of the relay receiver according to the present invention.

In FIG. 4, the received signal frequency converting portion 1 has the same function as the portion 1 in FIG. 1, namely to convert a high frequency band received signal into an intermediate frequency band signal.

Intermediate frequency amplifying portion 2 has the same function as portion 2 in FIG. 1, namely to amplify the output of receiving frequency converting portion 1 in accordance with the state of a gain control signal inputted from automatic gain controller 5.

Automatic gain controller 5 produces a gain control signal for maintaining the above recited amplified output at a predetermined level, using the amplified output from intermediate frequency amplifying portion 2, even if the arriving level of the received signal in the high frequency band changes.

Variable band limiting portion 7 limits the frequency band of the amplified output from intermediate frequency amplifying portion 2 to the frequency band corresponding to the state of the band control signal input from band control portion 6, thereby outputting a communication signal subjected to the band limitation.

Band control portion 6, utilizing a gain control signal from automatic gain controller 5, outputs a band control signal in accordance with the arrival level of a received signal to control variable band limiting portion 7.

In the above structure, the band control portion 6 receives a gain control signal transmitted from automatic gain controller 5 to intermediate frequency amplifying portion 2, limits the band width of variable band limiting portion 7 in accordance with the gain control signal if the arriving signal level of the received signal is low, and oppositely broadens the band width of variable band limiting portion 7 if the arriving signal level of the received signal is high.

The frequency band of the amplified communication signal is controlled to provide a narrow band only when the receiving level of the received signal decreases. In the case shown in FIG. 3B, the noise component shown by a slanted line is suppressed. Therefore, the bit error ratio of the channel relating to the received signal is improved and the frequency band width of the transmission signal is prevented from expanding because of the noise component. The interference between adjacent channels is thereby decreased.

However, if the frequency band of the communication signal is controlled to provide a narrow band, the amplitude delay characteristic is degraded as recited above. However, the decrease in a level of the received signal does not occur along the entire transmission paths, and thus it is unnecessary for the relay receiver in all the relay stations to provide a narrow frequency band for the communication signal. In many relay stations where the arriving levels of received signals are high, the relay operation is conducted while keeping the frequency band of the communication signal broad, thereby providing little degradation of the amplitude delay characteristics. In this case, therefore, the present invention virtually avoids the prior-art problem whereby the amplitude delay characteristic of the communication signal degrades as the number of the relays increases. In the present invention, increase of the bit error ratio is suppressed to a minimum.

Figure 5:
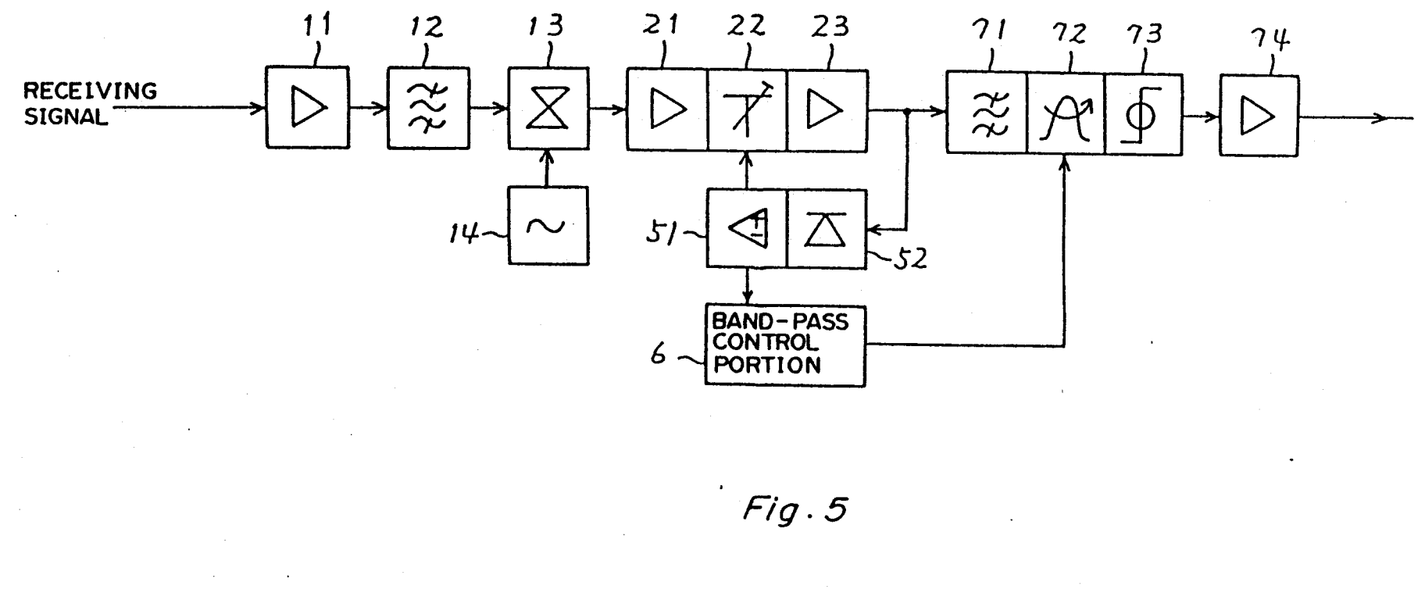
FIG. 5 shows a block diagram of the preferred embodiment according to the present invention.

FIG. 5 shows a block diagram of the preferred embodiment of the relay receiver according to the present invention. Receiving high frequency amplifier 11, high frequency band pass filter 12, receiving frequency converter 13 and receiving station oscillator 14 perform the same function as portions 11 to 14, respectively, in FIG. 2, thereby forming receiving frequency converting portion 1 shown in FIG. 4.

Intermediate frequency amplifiers 21 and 23 and variable attenuator 22 have the same function as respective parts 21, 22 and 23 in FIG. 2, thereby forming intermediate frequency amplifying portion 2 shown in FIG. 4. Detector 52 and comparator 51 form automatic gain controller 5, as shown in FIG. 4. Intermediate frequency band pass filter 71, variable band limiter 72, relay equalizer 73 and intermediate frequency amplifier 74 form variable band limiting portion 7 shown in FIG. 4. Band control portion 6 in FIG. 5 is the same as that in FIG. 4.

Figure 6:
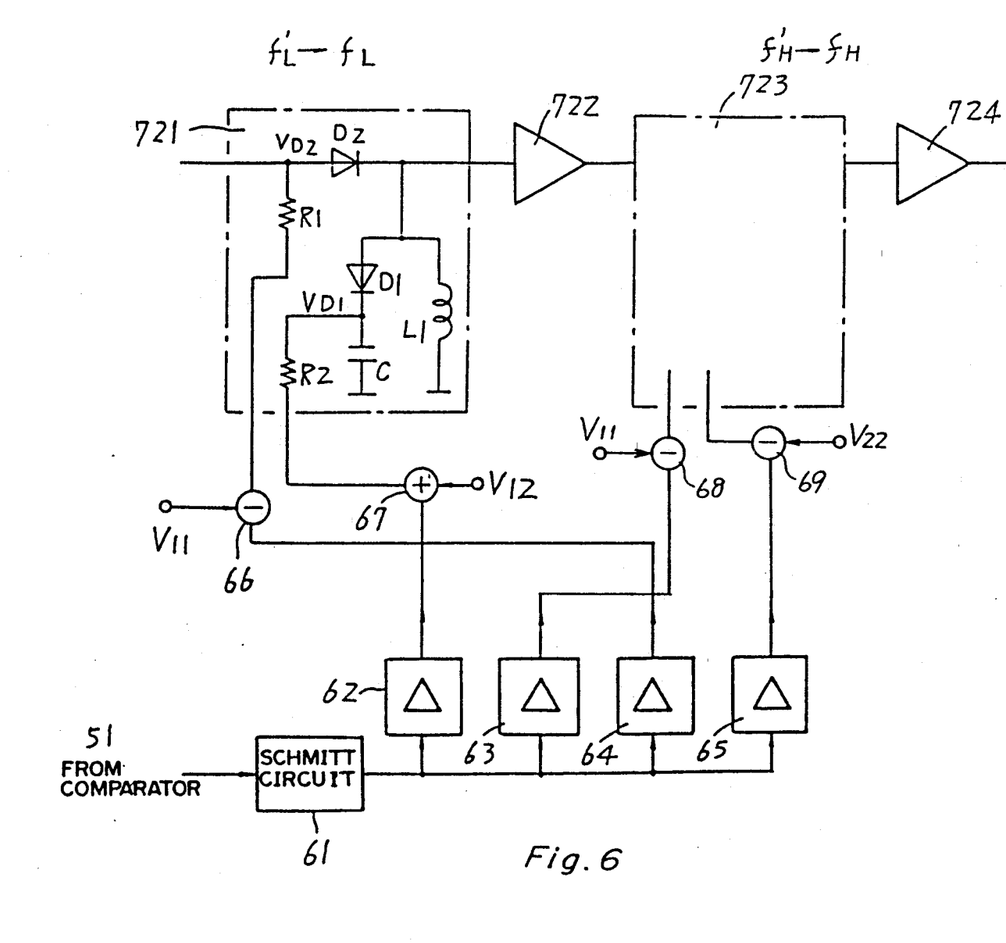
FIG. 6 is a block diagram of the variable band limiting portion and the band control portion in the preferred embodiment of the present invention.

FIG. 6 shows a circuit structure of band control portion 6 and variable band limiter 72 shown in FIG. 5. Here, Schmitt circuit 61, direct amplifiers 62 to 65, subtractors 66, 68 and 69, and adder 67 form band control portion 6 shown in FIG. 5. The output of comparator 51 shown in FIG. 5 is applied to the Schmitt circuit 61 and the outputs of Schmitt circuit 61 are respectively directed to direct current amplifiers 62 to 65. The output voltage of direct amplifier 64 is subtracted from voltage $V_{11}$ by subtractor 66. The output voltage of direct amplifier 62 is added to voltage $V_{12}$ by adder 67. The output voltage of direct amplifier 63 is subtracted from voltage $V_{11}$ by subtractor 68. The output voltage of direct amplifier 65 is subtracted from voltage $V_{22}$ by subtractor 69. The output of subtractor 68 is connected to resonator 723 in the same manner that subtractor 66 is connected to resonator 721. The output of subtractor 69 is connected to resonator 723 in the same manner that adder 67 is connected to resonator 721. Resonators 721 and 723 and buffer amplifiers 722 and 724 form variable band limiter 72 shown in FIG. 5. FIG. 6 shows only the structure of resonator 721, but resonator 723 is of the same structure. The output of intermediate frequency band pass filter 71 of FIG. 5 is connected to a first terminal of resistor R1 and anode of pin diode D2. The output of subtractor 66 is connected to the second terminal of resistor R1. A cathode of pin diode D2 is inputted to buffer amplifier 722 and is connected to an anode of variable capacitor diode D1 and the first terminal of coil L1. The cathode of variable capacitor diode D1 is connected to the first terminal of resistor R2 and the first terminal of capacitor C. The second terminal of resistor R2 is connected to the output of adder 67. The second terminal of capacitor C and the second terminal of coil L1 are grounded. The output of buffer amplifier 722 is connected to an anode of pin diode D2 in resonator 723 and the first terminal of resistor R1. A cathode of pin diode D2 in resonator 723 is connected to buffer amplifier 724. The output of buffer amplifier 724 is inputted to delay equalizer 73 shown in FIG. 5.

An operation of the preferred embodiment shown in FIG. 5 and 6 will be explained as follows.

The signal received by the receiving antenna (not shown) and having a predetermined central frequency is inputted to receiving frequency converter 13 through receiving high frequency amplifier 11 and high frequency band pass filter 12. The receiving station signal from receiving station oscillator 14 is then inputted to receiving frequency converter 13 and is thereby converted into an intermediate frequency band received signal.

The conversion output is amplified by intermediate frequency amplifier 21, variable attenuator 22 and intermediate frequency amplifier 23. In this case, detector 52 and comparator 51 control the amount of attenuation of variable attenuator 22 so that the output of intermediate frequency amplifier 23 is at a predetermined level.

The predetermined level of the output from intermediate frequency amplifier 23 is transmitted through intermediate frequency band pass filter 71 having a predetermined value of band width, through variable band limiter 72 controlled by band control portion 6, and through delay equalizer 73. The signal is further amplified by intermediate frequency amplifier 74, thereby being transmitted to the receiving side.

The operation of band control portion 6 and variable band limiter 76 are most important to the present invention and their operation will be explained by referring to the structure shown in FIG. 6 and the explanatory view shown in FIG. 7. When the arriving signal level of the received signal is higher than a predetermined value, the voltage from comparator 51 in FIG. 5 is low and thus the low level output voltage from Schmitt circuit 61 in FIG. 6 is applied to subtractor 66 through direct amplifier 64. The above low level voltage is subtracted from the predetermined voltage value $V_{11}$ in subtractor 66 and the voltage value $V_{D2}$ is thus applied to pin diode D2 through resistor R1. In this case, the voltage to be subtracted from predetermined voltage $V_{11}$ by subtractor 66 is of a low level, and thus voltage $V_{D2}$ becomes relatively high. Therefore, the diode resistance of pin diode D2 becomes small and the Q value in resonator 721 becomes relatively low.

On the other hand, the low level output voltage from Schmitt circuit 61 is applied to adder 67 through direct amplifier 62. The above low level voltage is added to the predetermined voltage value $V_{12}$ in adder 67 and thus voltage $V_{D1}$ is applied to a portion connecting variable capacitance diode D1 and capacity C through resistor R2. In this case, the voltage value added to the predetermined voltage value $V_{12}$ in adder 67 is of a low level and thus the voltage value $V_{D1}$ becomes relatively low. Therefore, the resonance frequency of the resonance circuit constituted by coil L1, variable capacity diode D1 and capacity C becomes relatively low in frequency $f_L'$ as shown in FIG. 7A.

Figure 7A:
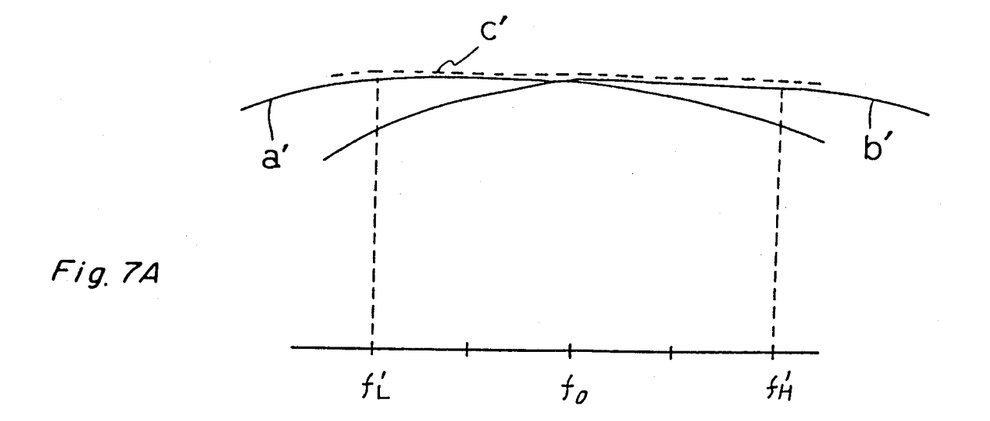
FIGS. 7A and 7B are views for explaining an operation of the preferred embodiment.

In accordance with the above operation, the resonance characteristics shown by a' in FIG. 7A can be obtained in resonator 721.

The low level voltage obtained by direct amplifier 63 through Schmitt circuit 61 is also applied to subtractor 68. The above low level voltage is subtracted from the predetermined voltage $V_{11}$ in subtractor 68 in a manner similar to that of subtractor 66. The output voltage of subtractor 68 controls resonator 723 in the same manner that the output voltage of subtractor 66 controls resonator 721. Therefore, the Q value in resonator 723 becomes relatively low in a similar manner to that in resonator 721.

Further, a low level voltage supplied from Schmitt circuit 61 through direct amplifier 65 is applied to subtractor 69. The above low level voltage is subtracted from the voltage $V_{22}$ by subtractor 69 the voltage $V_{22}$ differing from voltage $V_{12}$ in adder 67 and, thereby providing a relatively high voltage value. Therefore, the output voltage from subtractor 69 controls resonator 723 in the same manner that the output voltage from adder 67 controls resonator 721. In this case, the output voltage from subtractor 69 is relatively high in an opposite manner to the output voltage from adder 67. Therefore, resonance frequency $f_H'$ determined by resonator 723 is relatively high as shown in FIG. 7A.

In accordance with the above operation, the resonance characteristics shown by b' in FIG. 7A can be obtained in resonator 723. Resonators 721 and 723 are connected in a cascade manner through buffer amplifiers 722 and 724, thereby providing a characteristic wide band as shown by c' in FIG. 7A. Therefore, when the arriving signal level of the received signal is high, the relay can be conducted while the frequency band of the communication signal kept wide.

In this case, the amount of attenuation in variable attenuator 22 of FIG. 5 is large and thus the noise component is almost not included in the frequency characteristic of the amplified output from the intermediate frequency amplifier 23 as shown in FIG. 3A. Therefore, even if the relay is conducted while the frequency band of the communication signal is kept wide, a transmission signal with a low bit error ratio, little interference between adjacent channels and whose amplitude delay characteristics are not degraded can be obtained.

In contrast with the case recited above, when the arriving signal level of the received signal is less than a predetermined value, the output voltage from comparator 51 in FIG. 5 becomes large. Therefore, a high level output voltage is applied to subtractor 66 through Schmitt circuit 61 and direct current amplifier 64 shown in FIG. 6. Subtractor 66 subtracts the above high level voltage from predetermined voltage $V_{11}$, thereby applying voltage $V_{D2}$ to pin diode D2 through resistor R1. In this case, as the voltage to be subtracted from predetermined voltage $V_{11}$ in subtractor 66 is of a high level, voltage $V_{D2}$ becomes relatively low. Therefore, the diode resistor of pin diode D2 becomes large and the Q value in resonator 721 becomes relatively high.

The high level voltage emerging from Schmitt circuit 61 a high level output voltage is applied to adder 67 through direct amplifier 62. The above high level voltage is added to predetermined voltage $V_{12}$ in adder 67, thereby applying voltage $V_{D1}$ to portion connecting variable capacity diode D1 and capacity C through resistor R2. In this case, as voltage added to predetermined voltage $V_{12}$ in adder 67 is of a high level, voltage $V_{D1}$ also becomes relatively high. Therefore, the resonance frequency of the resonance circuit constituted by coil L1, variable capacity diode D1 and capacity C2 is shifted to a relatively high frequency $f_L$ as shown in FIG. 7B.

Figure 7B:
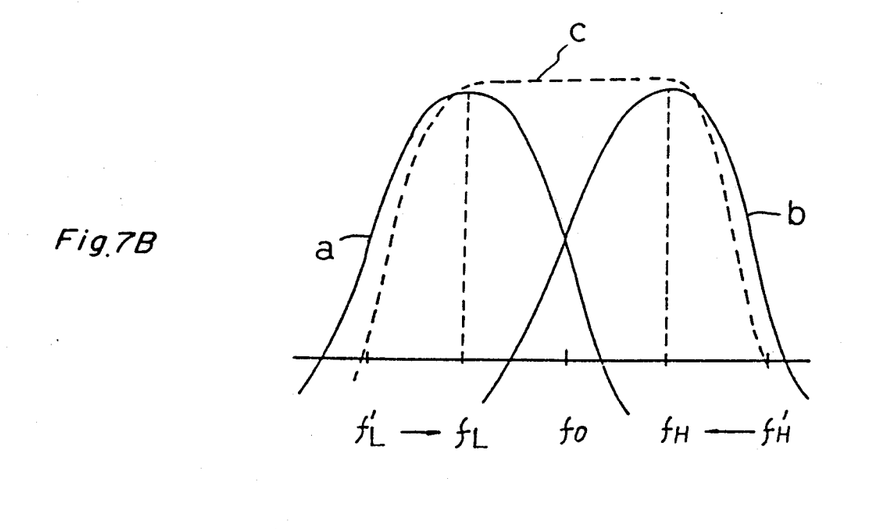

In accordance with the above operation, the resonance characteristic shown by a in FIG. 7B is obtained in resonator 721.

On the other hand, the high level voltage is applied to direct current amplifier 63 through Schmitt circuit 61 and that is added to subtractor 68. In subtractor 68, the above high level voltage is subtracted from predetermined $V_{11}$ in a manner similar to that in subtractor 66. Output voltage from subtractor 68 controls resonator 723 in the same manner that the output voltage of subtractor 66 controls resonator 721. Therefore the Q value in resonator 723 becomes relatively high in a manner similar to that in resonator 721.

The high level voltage received through direct current amplifier 65 from Schmitt circuit 61 is added to subtractor 69. In subtractor 69, the above high level voltage is subtracted from voltage $V_{22}$ which is different from that in adder 67, thereby outputting a relatively low voltage value. The output voltage from subtractor 69 controls resonator 723 in the same manner that the output voltage from adder 67 controls resonator 721. In this case, the output voltage from subtractor 69 becomes relatively low in a manner opposite to the output voltage from adder 67. Therefore, resonance frequency $f_H$ determined by resonator 723 becomes relatively low as shown by b in FIG. 7B.

In accordance with the above operation, the resonance characteristic shown by b in FIG. 7B is obtained in resonator 723. By connecting resonators 721 and 723 through buffer amplifiers 722 and 724 respectively in a cascade manner, the narrow band characteristic shown by c in FIG. 7B is provided. Therefore, when the arriving signal level of the received signal is low, the frequency band of the communication signal is made narrow during a relay.

As the level of attenuation in variable attenuator 22 in FIG. 5 is small, both the noise component and the communication signal component are included in the frequency characteristic of the amplified output of intermediate frequency amplifier 23 as shown by a slanted line in FIG. 3B. The noise component has a band width of plus or minus 40 MHz to plus or minus 50 MHz with respect to the central frequency, with the communication signal component has a band width of plus or minus 25 MHz also with respect to the central frequency. Accordingly, in the case of the example shown in FIG. 3B, the noise component can be removed by adjusting the operation characteristic of variable band limiter 72 shown in FIG. 6 such that resonance frequencies $f_L$ and $f_H$ shown in FIG. 7B become $f_0$ plus or minus 25 MHz, where $f_0$ is a central frequency in an intermediate frequency band of a communication signal.

In accordance with the above operation, a transmission signal with a low bit error ratio and with little interference between adjacent channels can be obtained. As the above control is conducted only in a relay station receiving a low-level of receiving signal, it is unnecessary to narrow the frequency band of a communication signal in all the relay stations. Therefore, the conventional problem wherein the amplitude delay characteristic of a communication signal is increasingly degraded in accordance with an increase of a number of the relays is avoided. The present invention suppresses the bit error ratio to a minimum.

What is claimed is:

1. A relay receiver for performing a heterodyne relay by converting a frequency of a high frequency band received signal to an intermediate frequency band signal and for amplifying the intermediate frequency band signal, comprising:
   received frequency converting means for converting the frequency of the high frequency band received signal to an intermediate frequency band to produce an intermediate frequency band signal,
   intermediate frequency amplifying means for amplifying the intermediate frequency band signal in accordance with a gain control signal to output an amplified signal,
   automatic gain control means for generating the gain control signal based on the amplified signal so that the amplified signal has a predetermined level regardless of a change in an arriving level of the high frequency band received signal,
   variable band limiting means for band pass filtering the amplified signal to pass a variable frequency band of the amplified signal in accordance with a band control signal, and
   band control means for outputting the band control signal to control the variable frequency band to a first band when the arriving level of the high frequency band received signal is more than a predetermined value and to control the variable frequency band to a second band narrower than the first band when the arriving level of the high frequency band received signal is less than the predetermined value.

2. The relay receiver according to claim 1,
   wherein said variable band limiting means comprises a low frequency side resonator and a high frequency side resonator connected in a cascade manner, and
   wherein said band control means comprises
   means for setting said low frequency site resonator and said high frequency side resonator to a predetermined first Q value, setting said low frequency side resonator to a first low frequency side resonance frequency, and setting said high frequency side resonator to a first high frequency side resonator frequency when the gain control signal indicates that the arriving level of the high frequency band received signal is more than a predetermined level, and means for setting said low frequency side resonator and said high frequency side resonator to a predetermined second Q value larger than the predetermined first Q value, setting said low frequency side resonator to a second low frequency side resonance frequency higher than the first low frequency side resonance frequency, and setting said high frequency side resonator to a second high frequency side resonance frequency lower than the first high frequency side resonance frequency when the gain control signal indicates that the arriving level of the high frequency band received signal is less than the predetermined level.

3. The relay receiver according to claim 1, wherein the high frequency band received signal is of a microwaver band frequency.

4. A relay receiver for performing a heterodyne relay by converting a frequency of a high frequency band received signal to an intermediate frequency band signal and for amplifying the intermediate frequency band signal, comprising:

received frequency converting means for converting the frequency of the high frequency band received signal to an intermediate frequency band to produce an intermediate frequency band signal, intermediate frequency amplifying means for amplifying the intermediate frequency band signal in accordance with a gain control signal to output an amplified signal, automatic gain control means for generating the gain control signal based on the amplified signal, so that the amplified signal has a predetermined level regardless of a change in an arriving level of the high frequency band received signal, variable band limiting means for band pass filtering the amplified signal to pass a variable frequency band of the amplified signal in accordance with a band control signal, and band control means for outputting the band control signal to control the variable frequency band to a first band when the arriving level of the high frequency band received signal is more than a predetermined value and to control the variable frequency band to a second band narrower than the first band when the arriving level of the high frequency band received signal is less than the predetermined value and wherein said variable band limiting means comprises a low frequency side resonator and a high frequency side resonator connected in a cascade manner, and wherein said band control means comprises means for setting said low frequency side resonator and said high frequency side resonator to a predetermined first Q value, setting said low frequency side resonator to a first low frequency side resonator frequency, and setting said high frequency side resonator to a first high frequency side resonator frequency when the gain control signal indicates that the arriving level of the high frequency band received signal is more than a predetermined level, and means for setting said low frequency side resonator and said high frequency side resonator to be a predetermined second Q value larger than the predetermined first Q value, setting said low frequency side resonator to a second low frequency side resonance frequency higher than the first low frequency side resonance frequency, and setting said high frequency side resonator to a second high frequency side resonance frequency lower than the first high frequency side resonance frequency when the gain control signal indicates that the arriving level of the high frequency band received signal is less than the predetermined level, and wherein said band control means comprises means for outputting the band control signal comprising first, second and third control signals, wherein the first control signal is set to a first voltage value and the second and third control signals are set to a second voltage value, wherein the third control signal is a third voltage value higher than the second voltage value when the arriving level of the high frequency band receiving signal is more than a predetermined value, and wherein the first control signal is a fourth voltage value lower than the first voltage value, the second control signal is a fifth voltage value higher than the second voltage value and the third control signal is a sixth voltage value lower than the third voltage value when the arriving level of the high frequency band receiving signal is less than the predetermined value, wherein said low and high frequency side resonators each comprise means for increasing respective Q values in accordance with an increase in voltage of the first control signal, wherein said low frequency side resonators comprises means for lowering a resonance frequency of the low frequency side resonator in accordance with a decrease in the voltage of the second control signal, and wherein said high frequency side resonator comprises means for lowering a resonance frequency of the low frequency side resonator in accordance with a decrease in the voltage of the second control signal.

5. The relay receiver according to claim 4, wherein said automatic gain control means comprises means for outputting the gain control signal at a low level voltage when the arriving level of the high frequency band received signal is more than a predetermined threshold and for outputting the gain control signal at a high level voltage when the arriving level of the high frequency band received signal is less than the predetermined threshold, and wherein said band control means comprises:

a Schmitt circuit connected to receive the gain control signal to produce an output, first, second, third and fourth direct current amplifiers connected to receive the output of said Schmitt circuit for amplifying in a predetermined amplification ratio to produce outputs, a first subtractor connected to subtract the output of the first direct amplifier from the first reference voltage and output the first control signal to said low frequency side resonator, an adder connected to add an output voltage of the second direct current amplifier to the second reference voltage and output the second control signal to said low frequency side resonator, a second subtractor connected to subtract the output voltage of the third direct current amplifier from the first reference voltage and output the first control signal to said high frequency side resonator, and a third subtractor connected to subtract the output voltage of the fourth direct current amplifier from the third reference voltage value and output the third control signal to said high frequency side resonator.

6. A relay receiver for performing a heterodyne relay by converting the frequency of a high frequency band received signal to an intermediate frequency band signal and for amplifying said intermediate frequency band signal, comprising:

received frequency converting means for converting the frequency of the received signal to an intermediate frequency band to produce an intermediate frequency band signal, intermediate frequency amplifying means for amplifying the intermediate frequency band signal in accordance with a gain control signal to output an amplified signal, automatic gain control means for generating the gain control signal based on the amplified signal so that the amplified signal has a predetermined level regardless of a change in an arriving level of the high frequency band received signal, variable band limiting means for band pass filtering the amplified signal to pass a variable frequency band of the amplified signal in accordance with a band control signal, and band control means for outputting the band control signal to narrow the variable frequency band only when the gain control signal commands a gain for the relay receiver of less than a predetermined gain.

7. A relay receiver according to claim 6, wherein the predetermined gain is a unity gain.

* * * * *